(12) United States Patent
Komatsu et al.

(10) Patent No.: US 7,084,287 B2
(45) Date of Patent: Aug. 1, 2006

(54) METHOD OF REMOVING PALLADIUM

(75) Inventors: Masashi Komatsu, Nishinomiya (JP); Kazuya Inoue, Ibaraki (JP)

(73) Assignee: Sumitomo Chemical Company, Limited, Tokyo (JP)

( * ) Notice: Subject to any disclaimer, the term of this patent is extended or adjusted under 35 U.S.C. 154(b) by 0 days.

(21) Appl. No.: 11/122,019

(22) Filed: May 5, 2005

(65) Prior Publication Data

US 2005/0256327 A1 Nov. 17, 2005

(30) Foreign Application Priority Data

May 12, 2004 (JP) .............................. 2004-142066

(51) Int. Cl.
*C07F 15/00* (2006.01)
*C01G 55/00* (2006.01)
*B01J 31/00* (2006.01)

(52) U.S. Cl. ............................ 556/13; 502/60; 423/22
(58) Field of Classification Search ................. 556/13; 502/60; 423/22
See application file for complete search history.

(56) References Cited

U.S. PATENT DOCUMENTS

| | | | |
|---|---|---|---|
| 5,362,850 A * | 11/1994 | Cooper et al. | 528/483 |
| 5,491,250 A * | 2/1996 | Stark et al. | 556/466 |
| 2005/0181931 A1* | 8/2005 | Mouri et al. | 502/60 |

FOREIGN PATENT DOCUMENTS

| | | |
|---|---|---|
| JP | 3-66725 | 3/1991 |
| JP | 7-74073 | 3/1995 |
| JP | 2002-194450 | 7/2002 |
| JP | 2003-246862 | 9/2003 |
| JP | 2003-292878 | 10/2003 |
| JP | 2003-299905 | 10/2003 |
| JP | 2004-59444 | 2/2004 |

OTHER PUBLICATIONS

Chen, Cheng-yi et al., "Practical Asymmetric Synthesis of a Potent Cathespin K Inhibitor. Efficient Palladium Removal Following Suzuki Coupling", *J. Org. Chem.* 2003, vol. 68, pp. 2633-2638.

Cooke, Jason W.B. et al., "Process Research and Development of a Dihydropyrimidine Dehydrogenase Inactivator: Large Scale Preparation of Eniluracil Using a Sonogashira Coupling", *Organic Process Research & Development*, 2001, vol. 5, pp. 383-386.

Ishihara, Kazuaki et al., "Removal of Palladium(II) from Aqueous and Organic Solutions by Polystyrene-bound Trimercaptotriazine", *Chemistry Letters*, 2000, pp. 1218-1219.

* cited by examiner

*Primary Examiner*—Porfirio Nazario-Gonzalez
(74) *Attorney, Agent, or Firm*—Foley & Lardner LLP

(57) ABSTRACT

There is disclosed a method for removing palladium, which method is characterized by contacting a solution containing a palladium complex containing a phosphorus-type ligand in an organic solvent with a layered clay compound or a zeolite having a pore diameter of 0.6 to 2 nm.

9 Claims, No Drawings

METHOD OF REMOVING PALLADIUM

BACKGROUND OF THE INVENTION

The present invention relates to a method of removing palladium.

Palladium complexes having a phosphorous-type ligand (e.g. triphenylphosphine) have been used as catalysts for a variety of organic synthetic reactions such as the Suzuki coupling reaction, the Sonogashira coupling reaction, the Heck reaction, the Buchwald reaction, and the carbonylation reaction (e.g., see Ei-ichi Negishi ed. "Handbook of Organopalladium Chemistry for Organic Synthesis," J, A John Wiley & Sons, 2002; Jiroh Tsuji, "Palladium Reagents and Catalysts-Innovations in Organic Synthesis," A John Wiley & Sons, 1995; and The Chemical Society of Japan ed. "Jikken Kagaku Koza (Vol. 25) Yuki Gosei VII," $4^{th}$ ed. pp. 396–427, Maruzen Co., Ltd.), and these reactions are becoming more important in the production of pharmaceuticals, agricultural chemicals, electronic materials and their production intermediates. The reaction mixture after completion of the reaction, or the reaction products obtained form the reactions contain employed palladium, as an undesirable impurity, in terms of the application of the obtained chemicals. As such, for removal of palladium there have been employed various treatments such as the one using activated carbon (e.g., see Organic Process Research & Development, 2001, 5, 383), or extraction treatment with an aqueous lactic acid solution (e.g., see J. Org. Chem., 2003, 68, 2633).

According to the present invention, efficient removal of palladium in a solution can be accomplished.

An aspect of the present invention relates to a method for removing palladium, which method comprises contacting a solution containing a palladium complex comprising a phosphorus-type ligand in an organic solvent with a layered clay compound or a zeolite having a pore diameter of 0.6 to 2 nm.

DETAILED DESCRIPTION OF THE INVENTION

The solution containing a palladium complex comprising a phosphorus-type ligand is not particularly limited as long as the solution is an organic solvent solution in which a palladium complex comprising a phosphorus-type ligand is dissolved.

Typically examples thereof are an organic solvent solution containing the palladium complex comprising a phosphorus-type ligand that may be suitably used for a palladium catalyzed organic synthetic reaction, which solution may further contain the resultant reaction product(s) and other optional auxiliary agent (e.g other metal components such as copper, and components such as bases); and the organic solvent solution that is obtained after completion of the reaction, for example, through post-treatment such as extraction or filtration.

As for the organic synthetic reaction, reference is made to organic synthesis reactions that use known palladium complexes as described in "Handbook of Organopalladium Chemistry for Organic Synthesis, Palladium Reagents and Catalysts-Innovations in Organic Synthesis," "Jikken Kagaku Koza (Vol. 25) Yuki Gosei VII," $4^{th}$ ed. pp. 396–427, and other documents.

Examples of the organic synthetic reactions include, for example, hydrogenation, dehydrogenation, dehalogenation of aryl halides, rearrangement of unsaturated bonds of unsaturated compounds, polymerization, carbon-carbon bond formatting reaction, carbon-nitrogen bond forming reaction, and the like. Of these, the method of the present invention is suitable for carbon-carbon bond forming reactions and carbon-nitrogen bond forming reactions that are frequently used as synthesis reactions of pharmaceuticals, agricultural chemicals, electronic materials and intermediates thereof.

The carbon-carbon bond forming reactions and carbon-nitrogen bond forming reactions are typically, for example, the Suzuki coupling reaction of reacting an aryl halide with an arylboric acid, the Sonogashira coupling reaction of reacting an aryl halide with an alkyne, the Heck reaction of reacting an aryl halide or a vinyl halide with an olefin, the Buchwald reaction of reacting an aryl halide with amine, the carbonylation reaction of reacting an aryl halide, carbon monoxide, and an alcohol, the α-aryl ketone synthesis reaction of reacting an aryl halide with a ketone, a coupling reaction of an aryl halide and an organic zinc reagent, and the like.

The phosphorous-type ligand is not particularly limited so long as the ligand contains a phosphorous atom capable of coordinating to palladium of zero valent or divalent, and examples of the phosphorous-type ligand include, for example, monodentate phosphine-type ligands such as trimethylphosphine, triethylphosphine, tri(n-butyl)phosphine, tricyclohexylphosphine, triphenylphosphine, or tri(o-tolyl) phosphine, monodentate phosphite-type ligands such as triphenylphosphite, bidentate phosphine-type ligands such as bis(diphenylphosphino)methane, 1,2-bis(diphenylphosphino)ethane, 1,3-bis(diphenylphosphino)propane, 2,3-bis(diphenylphosphino)bicyclo[2.2.1]hept-5-ene, 4,5-bis(diphenylphosphinomethyl)-2,2-dimethyl-1,3-dioxolane, 2,2-bis(diphenylphosphino)-1,1'-binaphthalene, or 1,1'-bis(diphenylphosphino)ferrocene. Preferred are the monodentate or bidentate phosphine-type ligands, and more preferred are the monodentate phosphine-type ligands.

The palladium complex comprising a phosphorous-type ligand includes, for example, a palladium complex comprising a phosphorous-type ligand that can be formed from a palladium source and the phosphrous-type ligand prior to its use in the palladium catalyzed reaction, and a palladium complex comprising a phosphorous-type ligand formed from a palladium source, not having a phosphorous-type ligand and the phosphorous-type ligands, in situ of the palladium catalyzed reaction. The palladium complex comprising a phosphorous-type ligand may also have other ligands in addition to the phosphorous-type ligand.

Examples of the palladium complex comprising a phosphorous-type ligand include, for example, tetrakis(triphenylphosphine)palladium $(Pd(PPh_3)_4)$, dichlorobis(triphenylphosphine)palladium $(PdCl_2(PPh_3)_2)$, dichlorobis(triethylphosphine)palladium $(PdCl_2(PEt_3)_2)$, dichloro[1,1'-bis(diphenylphosphino)ferrocene]-palladium.dichloromethane complex $(PdCl_2(dppf).CH_2Cl_2)$.

Examples of the palladium source include, for example, palladium chloride $(PdCl_2)$, palladium bromide $(PdBr_2)$, palladium acetate $(Pd(OAc)_2)$, lithium tetrachloropalladate $(Li_2PdCl_4)$, bis ($n^3$-allyl) palladium, tris(dibenzylideneacetone) dipalladium $(Pd_2(dba)_3)$, bis(acetylacetonate) palladium $(Pd(acac)_2)$, dicyclobis(acetonitrile) palladium $((CH_3CN)_2PdCl_2)$, and dicyclobis(benzonitrile) palladium $((PhCN)_2PdCl_2)$.

Examples of the organic solvent include, for example, aliphatic hydrocarbon solvents such as pentane, hexane, heptane, octane, decane, or cyclohexane, aromatic hydrocarbon solvents such as toluene or xylene, ether solvents such as diethyl ether, diisopropyl ether, tetrahydrofuran, or dioxane, ester solvents such as ethyl acetate, ketone solvents such as acetone or methyl ethyl ketone, halogenated hydrocarbons such as dichloromethane or chlorobenzene, or mixtures thereof. Preferred are the aliphatic hydrocarbon solvents, the aromatic hydrocarbon solvents and mixtures thereof. Preferred mixture of the aliphatic hydrocarbon solvent and the aromatic hydrocarbon solvent is a mixture thereof containing the aliphatic hydrocarbon solvent in higher amount than the aromatic hydrocarbon solvent.

The amount of the organic solvent is optionally adjusted according to the reactions to be performed. For example, it may be typically from 0.5 to 100 parts by weight per part by weight of the reaction product, preferably from 2 to 50 parts by weight, more preferably from 3 to 30 parts by weight per part by weight of the reaction product.

A typical amount of the dissolved palladium in the solution, to which the present method is applied, is from 100 ppb to 1%, preferably from 100 ppb to 1000 ppm.

The layered clay compounds means a clay compound having a laminated structure comprising an oxide of magnesium, aluminum, iron, silicon, and the like, and examples of the layered clay compound include, for example, kaolinite, montmorillonite, halloysite, and the like. Preferred is the montmorillonite. Examples of the montmorillonite include, for example, activated clay, acid clay and the like. Preferred is the activated clay. The forms of such layered clay compounds are not particularly limited, and examples thereof include, for example, a powder form, a particle form, and the like. Preferably used is the layered clay of powder form. Such layered clay compounds are normally commercially available.

The zeolite having a pore diameter of 0.6 to 2 nm may be natural zeolite, or synthetic zeolite. Examples of the zeolite include, for example, zeolites having FAU structures such as Y type zeolite, Linde X, $AlPO_4$-37, or faujasite; zeolites having GME structures such as gmelinite; zeolites having LTL structures such as Linde L; zeolites having MAZ structures such as mazzite, and ZSM-4 zeolite; zeolites having MOR structures such as mordenite or zeolon; zeolites having OFF structures such as off retite or Linde T; and the like. Preferred are zeolites having FAU structures. Such zeolites are mostly commercially available; and synthetic zeolites produced in accordance with known methods may be used.

A suitable amount of the layered clay compound or the zeolite having a pore diameter of 0.6 to 2 nm is used by taking account of the content of the palladium complex in the solution, and usually 0.005 to 1 part by weight, preferably 0.01 to 0.5 part by weight of the layered clay compound or the zeolite having a pore diameter of 0.6 to 2 nm is used per part by weight of the solution.

Alternatively, the layered clay compound or the zeolite having a pore diameter of 0.6 to 2 nm may be used in the amount of 0.1 to 100 parts by weight per part by weight of the reaction product, preferably from 0.5 to 30 parts by weight when a reaction product(s) is contained in the solution.

The solution containing the palladium complex comprising phosphorous-type ligand is typically mixed with the layered clay compounds or zeolites having a pore diameter of 0.6 to 2 nm for a suitable period of time, and then separating the layered clay compound or the zeolite having the pore diameter of 0.6 to 2 nm, for example, by a normal separating means such as filtration or centrifugation. Alternatively, the solution is passed through a column packed with the layered clay compound or the zeolite having a pore diameter of 0.6 to 2 nm. The solution containing the palladium complex comprising a phosphorous-type ligand is typically mixed with the layered clay compounds or zeolites having a pore diameter of 0.6 to 2 nm at a temperature of normally from −50 to −200° C., preferably from −10 to 100° C. The separation of the layered clay compound or the zeolite having a pore diameter of 0.6 to 2 nm after the treatment is carried out, for example, by filtration, using a filtrating aid such as diatomaceous earth (e.g. celite®), if necessary. The contacting is suitably set according to the separation method and the amount of the solution containing the palladium complex comprising phosphorous-type ligand, and is not particularly limited. For example, it may be normally from 0.1 to 48 hours, preferably from 0.3 to 10 hours.

Thus, a low-palladium content solution is obtained. The low-palladium content, e.g., palladium content of less than 5 ppb, solution that may also contain the reaction product can be obtained. For example, the low-palladium content such as a palladium content of 15 ppb or less relative to the amount of reaction product can be attainable, and further treatment of subjecting the solution to concentration followed by crystallization, if necessary, can provide a reaction product of low-palladium content. Thus, palladium contents in the pharmaceuticals, agricultural chemicals, electronic materials and the like that are produced by such palladium-catalyzed reaction can be lowered with insignificant loss of the products.

EXAMPLES

The present invention will be set forth in more detail in terms of Examples below, but the invention is by no means limited to these Examples. Additionally, the amount of palladium in a solution (hereinafter, abbreviated as Pd) was calculated after subjecting a collected sample to concentrating treatment, followed by wet pressurization acid decomposition, evaporation to dryness, dissolution in aqua regia, and then ICP luminescence analysis (when the amount of Pd is 1 ppm or more) or ICP-MS analysis (when the amount of Pd is less than 1 ppm). The reaction product content in the solution is analyzed by high performance liquid chromatography and calculated.

Reference Example 1

Into a 100 mL flask were weighed 108.7 mg of tetrakis (triphenylphosphine)palladium ($Pd(PPh_3)_4$) and 98.7 mg of triphenylphosphine and hereto was added toluene to make a 100 mL solution. To 10 mL of this solution taken from the flask was added a toluene/hexane mixture solution (toluene/hexane weight ratio=17/83) and the total weight was made to be 1000 g, thereby a solution containing a Pd content of 1 ppm was prepared.

Example 1

To a 4-neck flask equipped with a thermometer, condenser, and stirrer were added 50 g of the solution containing Pd at a concentration of 1 ppm prepared in Reference Example 1 above and 7.5 g of activated clay (a product of Wako Pure Chemical Industries Ltd.) and the resulting solution was stirred for two hours at a solution temperature of 20° C. and allowed to stand. Thereafter, the activated clay was removed by filtration at the temperature. The collected activated clay was washed with 7.5 g of a toluene/hexane mixture solution (toluene/hexane weight ratio=17/83) twice. The resultant washing solution was combined with the previously obtained filtration solution. The combined solution was concentrated to obtain a 10 g concentrated solution. The Pd content in the concentrated solution was less than 5 ppb and the percentage of Pd removal was more than 99.9%.

Examples 2 to 5

An analysis was carried out in a similar manner as in Example 1 except that the amount of activated clay and the treatment temperature were set to the conditions in Table 1 below. The results are shown in Table 1.

TABLE 1

|  | Example 2 | Example 3 | Example 4 | Example 5 |
|---|---|---|---|---|
| Amount (g) | 7.5 | 7.5 | 0.75 | 15 |
| Treatment temperature (° C.) | 40 | 0 | 20 | 20 |
| Pd content in concentrated solutions (ppb) | 5> | 5> | 12 | 5> |
| Percentage of Pd removal (%) | >99.9 | >99.9 | >99.8 | >99.9 |

Example 6

An analysis was carried out in a similar manner as in Example 1 except that a Y type zeolite (pore diameter 0.74 nm) was used in place of activated clay in Example 1. The analysis showed the Pd content in the concentrated solution was less than 5 ppb, and the percentage of Pd removal was more than 99.9%.

Comparative Example 1

An analysis was carried out in a similar manner as in Example 1 except that a ZSM-5 zeolite (pore diameter 0.5 nm) was used in place of activated clay in Example 1. It has been found that the Pd content in the concentrated solution was 140 ppb, and the percentage of Pd removal was 97.2%.

Comparative Example 2

An analysis was carried out in a similar manner as in Example 1 except that diatomecious earth (Hyflo Super Cel, a product of Wako Pure Chemical Industries Ltd.) was used in place of activated clay in Example 1. It has been found that the Pd content in the concentrated solution was 230 ppb, and the percentage of Pd removal was 95.4%.

Reference Example 2

After the air inside a 1 litter flask equipped with a thermometer and stirrer was replaced by nitrogen, 43 g of 1,3-dibromoadamantane and 10 g of anhydrous aluminum bromide were placed therein, and then the inside of the flask was cooled to 0° C. Thereto was added 190 g of 1,3-dibromobenzene that was cooled to 5° C. in advance, and the resulting material was agitated and reacted at an inside temperature of 0 to 10° C. for 7 hours. The reaction was carried out while the hydrogen bromide gas that was generated during the reaction was absorbed into an aqueous alkaline solution for the removal of its toxicity. After the completion of the reaction, 130 g of 4% by weight hydrochloric acid was slowly dropped and then the solution was stirred until the orange color of the reaction solution faded away. The agitation was stopped and the resulting solution was allowed to stand and then separated by funnel. The resulting organic phase was washed with water three times. 190 grams of toluene was added to the organic phase after the washing, which was then warmed to remove water under reflux. Then, the organic solution was cooled and the crystal deposited was collected by filtration. The resulting crystal was subjected to washing with toluene, methanol and water, followed by drying under reduced pressure to obtain 44 g of 1,3-bis(3,5-dibromophenyl)adamantane.

After the air inside a 500 mL flask equipped with a thermometer, a ref lux condenser and a stirrer was replaced by nitrogen, 268 g of toluene, 26 g of triethylamine, 0.29 g of dichlorobis(triphenylphosphine)palladium ($PdCl_2(PHh_3)_2$), 0.58 g of triphenylphosphine and 0.23 g of copper(I) iodine were added thereto. To this solution was added 31 g of the 1,3-bis(3,5-dibromophenyl)adamantane obtained above and the resulting solution was warmed to a temperature of 80° C. At the temperature, 22 g of trimethylsilylacetylene was added dropwise thereto over 6 hours, and the resulting solution was kept for 2 hours at the same temperature for the Sonogashira coupling reaction. Upon the completion of the reaction, the resultant material was cooled to room temperature, and the insoluble components were removed by filtration. The collected material were washed with 31 g of toluene twice, and then the resulting washing solution was added to the previously obtained filtration solution. The combined solutions were added to 4% by weight hydrochloric acid, under stirring, and allowed to stand, and then separated. The separated organic phase was washed with 155 g of water twice, and concentrated under reduced pressure to obtain 66 g of a concentrated solution. The concentrated solution contained 50% by weight of 1,3-bis[3,5-bis(trimethylsilylethinyl)phenyl]adamantane, a reaction product of the Sonogashira reaction.

To the obtained, concentrated solution was added 165 g of hexane to prepare a solution having therein 14% by weight of 1,3-bis[3,5-bis(trimethylsilylethinyl)phenyl]adamantane. Into this solution was added 62 g of silica gel (a product of Kanto Kagaku, spherical and neutral, particle diameter: 100 to 210 μm) and the resulting material was agitated and retained for 2 hours at a temperature of 25° C. and then filtrated by means of a filter precoated with 31 g of similar silica gel. The silica gel on the filter was washed twice with 31 g of a toluene/hexane mixture solution (toluene/hexane weight ratio=17/83) and the washing solution yielded was combined with the filtrate solution to obtain 250 g of a solution containing 1,3-bis[3,5-bis(trimethylsilylethinyl) phenyl]adamantane solution. The washing solution was added to the filtration solution previously obtained. The amount of 1,3-bis[3,5-bis(trimethylsilylethinyl)phenyl]adamantane in the solution was 10% by weight, and the Pd amount relative to the amount of 1,3-bis[3,5-bis(trimethylsilylethinyl)phenyl]adamantane was 280 ppb. The toluene/hexane weight ratio in the solution was 17/73.

Example 7

Into a flask equipped with a thermometer and a stirrer were placed 100 parts by weight of the 1,3-bis[3,5-bis (trimethylsilylethinyl)phenyl]adamantane-containing solution as obtained in Reference Example 2 above and 28 parts by weight of activated clay (a product of Wako Pure Chemical Industries Ltd.), and the resulting material was stirred at room temperature for 2 hours and maintained.

Then, at the temperature the activated clay was separated by filtration. The separated activated clay was washed twice with 28 parts by weight of hexane, and the resultant washing solution was combined the previously obtained filtrate solution. The combined solution was concentrated to obtain 20 parts by weight of a concentrated solution containing 50% by weight of 1,3-bis[3,5-bis(trimethylsilylethinyl)phenyl]adamantane. The Pd content relative to the amount of 1,3-bis[3,5-bis(trimethylsilylethinyl)phenyl]adamantane in the concentrated solution was less than 10 ppb, and the Pd removal percentage was more than 98.2%. Additionally, the percentage of recovery of 1,3-bis[3,5-bis(trimethylsilylethinyl)phenyl]adamantane was 100%.

Comparative Example 3

An analysis was carried out in a similar manner as in Example 7 except that activated carbon was used in place of activated clay in Example 7. it has been found that the Pd content was 22 ppb relative to that of 1,3-bis[3,5-bis(trimethylsilylethinyl)phenyl]adamantane in the concentrated solution, and the percentage of Pd removal was 92.1%. Additionally, the percentage of recovery of 1,3-bis[3,5-bis(trimethylsilylethinyl)phenyl]adamantane was 73%.

Comparative Example 4

An analysis was carried out in a similar manner as in Example 7 except that diatomecious earth was used in place of activated clay in Example 7. It has been found that the Pd content was 154 ppb relative to that of 1,3-bis[3,5-bis(trimethylsilylethinyl)phenyl]adamantane in the concentrated solution, and the percentage of Pd removal was 44.9%. Additionally, the percentage of recovery of 1,3-bis[3,5-bis(trimethylsilylethinyl)phenyl]adamantane was 98%.

Reference Example 3

An experiment was carried out in a similar manner as in Reference Example 2 except that a filter without precoating was used in place of the filter precoated with 31 g of the silica gel in Example 2. It has been found that 260 g of a solution containing 1,3-bis[3,5-bis(trimethylsilylethinyl)phenyl]adamantine was obtained. The content of 1,3-bis[3,5-bis(trimethylsilylethinyl)phenyl]adamantane in the solution was 12% by weight, and the Pd content was 2000 ppb relative to that of 1,3-bis[3,5-bis(trimethylsilylethinyl)phenyl]adamantane. In addition, the toluene/hexane by weight ratio was 15/73.

Example 8

An analysis was carried out in a similar manner as in Example 7 except that the solution containing 1,3-bis[3,5-bis(trimethylsilylethinyl)phenyl]adamantane as obtained in Reference Example 3 above was used in place of the solution containing 1,3-bis[3,5-bis(trimethylsilylethinyl)phenyl]adamantane as obtained in Reference Example 2 above in Example 7. It has been found that the Pd content was less than 10 ppb relative to that of 1,3-bis[3,5-bis(trimethylsilylethinyl)phenyl]adamantane in the concentrated solution, and the percentage of Pd removal was more than 99.5%. Additionally, the percentage of recovery of 1,3-bis[3,5-bis(trimethylsilylethinyl)phenyl]adamantane was 95%.

What is claimed is:

1. A method for removing palladium, which method comprises contacting a solution containing a palladium complex comprising a phosphorus-type ligand in an organic solvent with a layered clay compound or a zeolite having a pore diameter of 0.6 to 2 nm.

2. A method according to claim 1, wherein the solution further contains a product of an organic synthetic reaction catalyzed by the palladium complex comprising a phosphorus-type ligand.

3. A method according to claim 1, wherein the phosphorus-type ligand is a phosphine-type ligand.

4. A method according to claim 2, wherein the organic synthetic reaction is a carbon-carbon bond forming reaction or a carbon-nitrogen bond forming reaction.

5. A method according to claim 1, wherein the layered clay compound is activated clay.

6. A method according to claim 1, which further comprises the step of separating the layered clay compound or the zeolite having a pore diameter of 0.6 to 2 nm to obtain a low-palladium content solution.

7. A method according to claim 6, wherein the phosphorous-type ligand is a phosphine-type ligand.

8. A method according to claim 6, wherein the organic synthesis reaction is a carbon-carbon bond forming reaction or a carbon-nitrogen bond forming reaction.

9. A method according to claim 6, wherein the layered clay compound is activated clay.

* * * * *